United States Patent
Desai et al.

(10) Patent No.: US 8,359,635 B2
(45) Date of Patent: Jan. 22, 2013

(54) SYSTEM AND METHOD FOR DYNAMIC CREATION OF PRIVILEGES TO SECURE SYSTEM SERVICES

(75) Inventors: Saurabh Desai, Austin, TX (US); Murali Vaddagiri, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 12/036,318

(22) Filed: Feb. 25, 2008

(65) Prior Publication Data

US 2009/0217371 A1 Aug. 27, 2009

(51) Int. Cl.
- G06F 7/04 (2006.01)
- G06F 15/16 (2006.01)
- G06F 17/30 (2006.01)
- G06F 12/00 (2006.01)
- G06F 12/14 (2006.01)
- G06F 13/00 (2006.01)
- G06F 3/00 (2006.01)
- G06F 9/44 (2006.01)
- G06F 9/46 (2006.01)
- H04L 29/06 (2006.01)
- G11C 7/00 (2006.01)

(52) U.S. Cl. ............... 726/4; 726/17; 719/328
(58) Field of Classification Search ........... 726/4, 17; 719/328

See application file for complete search history.

(56) References Cited

U.S. PATENT DOCUMENTS

| | | | | |
|---|---|---|---|---|
| 5,335,346 | A | 8/1994 | Fabbio | 711/163 |
| 6,023,765 | A * | 2/2000 | Kuhn | 726/4 |
| 6,988,280 | B2 | 1/2006 | Burnett | 726/17 |
| 2002/0010768 | A1 | 1/2002 | Marks et al. | 709/223 |
| 2002/0091819 | A1 | 7/2002 | Melchione et al. | 709/224 |
| 2003/0200436 | A1 * | 10/2003 | Eun et al. | 713/172 |
| 2005/0257245 | A1 * | 11/2005 | Patrick et al. | 726/1 |
| 2007/0005961 | A1 | 1/2007 | Hamblin et al. | 713/167 |
| 2007/0043943 | A1 | 2/2007 | Peretti | 713/167 |
| 2007/0282800 | A1 | 12/2007 | England et al. | 707/3 |
| 2008/0086738 | A1 * | 4/2008 | Nieminen | 719/328 |

(Continued)

FOREIGN PATENT DOCUMENTS

WO WO2006/005812 A2 1/2006

OTHER PUBLICATIONS

Fernandez, EB, "Structure for Security Administration," IBM Technical Disclosure Bulletin, Nov. 1978, p. 2527-2528.

(Continued)

*Primary Examiner* — Kambiz Zand
*Assistant Examiner* — Benjamin Kaplan
(74) *Attorney, Agent, or Firm* — VanLeeuwen & VanLeeuwen; David A. Mims, Jr.

(57) ABSTRACT

A system, method, and program product is provided that allows new privileges to be dynamically added to an operating system. Entities are assigned roles and these roles are associated with various authorizations. Authorizations are associated with privileges, including the new privilege. A request is received to dynamically add the new privilege to the operating system. The operating system then dynamically adds the new privilege to the system. A software service is installed that requires the new privilege. A request to execute the installed software service is received from an entity that is running on the operating system. The operating system allows the entity to execute the installed software service in response to determining that the entity has been granted the privilege. However, if the entity has not been granted the new privilege, then the operating system inhibits execution of the software service by the entity.

20 Claims, 8 Drawing Sheets

U.S. PATENT DOCUMENTS

| | | | |
|---|---|---|---|
| 2008/0134286 A1 | 6/2008 | Amdur et al. | 726/1 |
| 2008/0163335 A1 | 7/2008 | Hagstrom | 726/1 |
| 2008/0256606 A1* | 10/2008 | Koikara et al. | 726/4 |
| 2009/0007249 A1* | 1/2009 | Lu et al. | 726/9 |
| 2009/0037686 A1* | 2/2009 | Mendonca | 711/173 |
| 2009/0049196 A1* | 2/2009 | Smith et al. | 709/245 |
| 2009/0187964 A1 | 7/2009 | Kao et al. | 726/1 |

OTHER PUBLICATIONS

Bennett, RB, :"Object Management System," IBM Technical Disclosure Bulletin, Oct. 1975, p. 1356-1360.

Office Action for co-pending U.S. Appl. No. 12/145,745, mailed Jan. 25, 2011, 16 pages.

International Search Report for Application PCT/EP2008/066668, mailed Mar. 20, 2009, 9 pages.

Langford et al., "Compatibility of a Granular Privilege Mechanism with Setuid Programs," IBM Technical Disclosure Bulletin, International Business Machines Corporation, Mar. 1992, 3 pages.

Langford et al., "Privilege Control Mechanism for UNIX Systems.," IBM Technical Disclosure Bulletin, International Business Machines Corporation, Dec. 1991, 3 pages.

* cited by examiner

SYSTEM AND METHOD FOR DYNAMIC CREATION OF PRIVILEGES TO SECURE SYSTEM SERVICES

GOVERNMENT RIGHTS

This invention was made with Government support under PERCS PHASE III, HR0011-07-9-0002. THE GOVERNMENT HAS CERTAIN RIGHTS IN THIS INVENTION."

BACKGROUND OF THE INVENTION

1. Technical Field

The present invention relates to a system and method that dynamically creates privileges to secure system services. More particularly, the present invention relates to a system and method that dynamically creates privileges to an operating system in addition to standard privileges that are installed in the operating system by the operating system vendor.

2. Description of the Related Art

Operating system access control mechanisms are intended to protect programs and data from corruption, yet still allow sharing of system resources. These access control mechanisms attempt to support a broad range of authorization policies. While useful in limiting users and applications from accessing critical, or sensitive, processes and data, these access control mechanisms are implemented and largely fixed in an operating system. Today, large complex software applications, often with many layers and functions, execute on operating system. However, due to current operating system design, these applications are forced to use the same fixed privileges setup by the operating system. Privileges directed at a particular application are not supported.

In past generations, the operating system was the sole resource used by programs and processes for communication and synchronization. However, as mentioned above, very large application programs, such as IBM's Websphere™ application, are taking on responsibilities formerly performed exclusively by the operating system. As mentioned before, these large applications are forced to use the same set of privileges used by the operating system. Large, complex software applications, such as IBM's Websphere™, are increasingly being structured in terms of a base and a set of extensions which augment the functionality of the base. These complex applications often implement communication and synchronization activities between the base and the extensions without relying upon the operating system.

In addition to the increasing complexity and functionality of software applications, many current operating systems are no longer small, simplistic systems. Instead, current operating systems, even those running on a standalone workstations or personal computers, are often extremely complex. For this reason, associating the access control mechanism, such as privileges, solely with an operating system interface makes less sense today than in years past.

A misbehaving process generally has the potential to compromise the base system it extends because extensions are typically executed in the same address space and with the same privileges as the base and, therefore, have access to resources on which the base depends. Moreover, once compromised, a process having been granted operating system level privileges might wreck havoc on a system by abusing its privileges. This can either be in the form of processes that have bugs or logic errors that cause unforeseen difficulties to malevolent processes, such as viruses, that deliberately abuse and thwart access control mechanisms in order to disrupt, or even damage, the computer system.

SUMMARY

It has been discovered that the aforementioned challenges are resolved using a system, method and computer program product that allows new privileges to be dynamically added to an operating system. In this manner, a software service, such as a large software application, can also install a new privilege that is required to use the service. Entities, such as users or processes, are assigned roles and these roles are associated with various authorizations. These authorizations are associated with various privileges, including the new privilege.

A request is received from a software application being executed by an operating system that is managing a computer system. This request is to dynamically add the new privilege to the operating system. The operating system then dynamically adds the new privilege to the system. A software service, such as a large software application (e.g., Websphere™, etc.) is installed that requires the new privilege. A request to execute the installed software service is received from an entity that is running on the operating system.

The operating system allows the entity to execute the installed software service in response to determining that the entity has been granted the privilege. However, if the entity has not been granted the new privilege, then the operating system inhibits execution of the software service by the entity.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
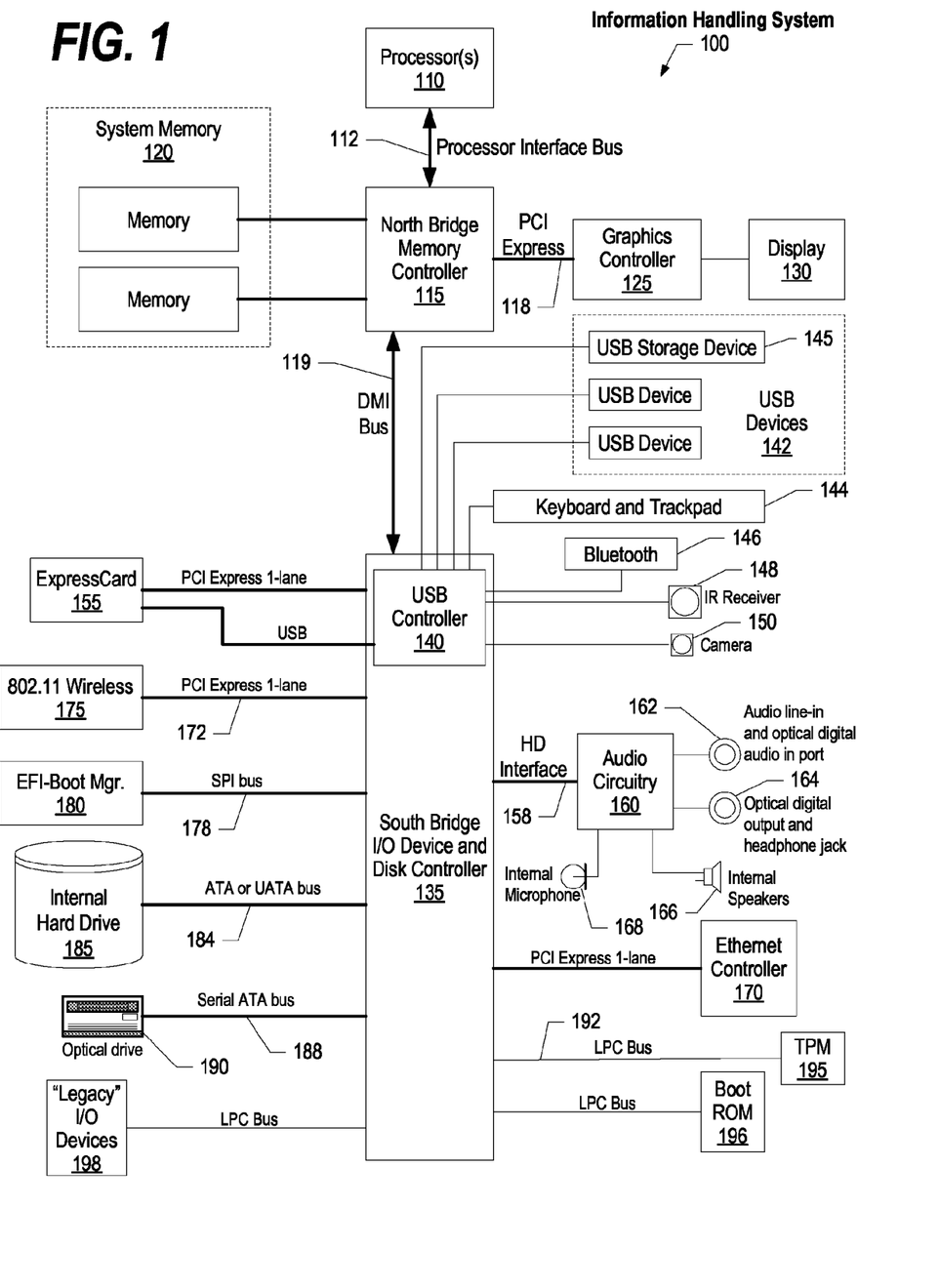
FIG. 1 is a block diagram of a data processing system in which the methods described herein can be implemented.
Figure 2:
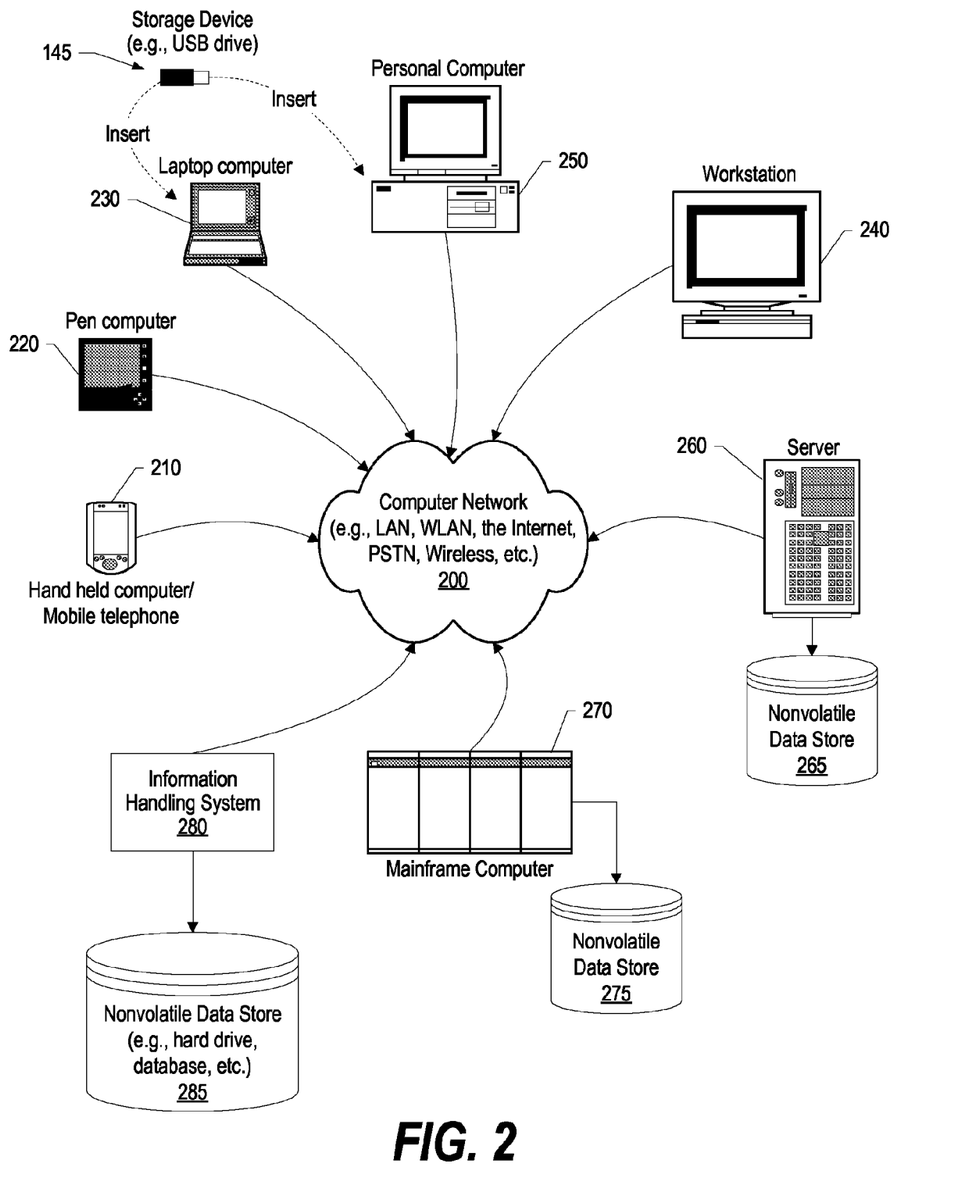
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
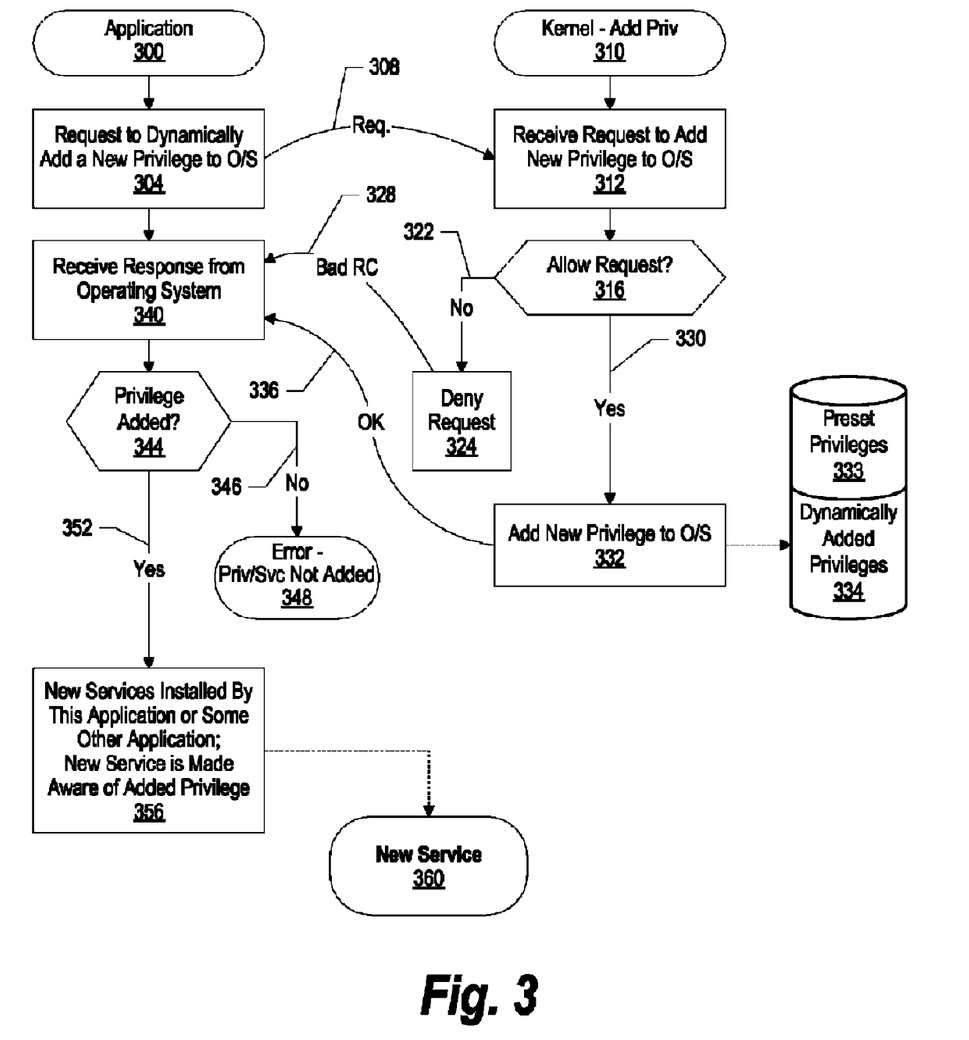
FIG. 3 is a high-level flowchart showing the interaction between an application and the operating system (kernel) in order to add a new privilege to the operating system.

FIG. 3 is a high-level flowchart showing the interaction between an application and the operating system (kernel) in order to add a new privilege to the operating system. Application processing commences at 300 whereupon, at step 304 the application requests to dynamically add a new privilege to the operating system. Request 308 is sent to the operating system. Operating system (kernel) processing is shown commencing at 310 whereupon, at step 312, the operating system receives the application's request to add a new privilege to the operating system. The operating system makes a determination is made as to whether to allow the request (decision 316). This decision may be based on another privilege or authorization that the application needs in order to be allowed to add new privileges to the operating system. If the request from the application is not approved, then decision 316 branches to "no" branch 322 whereupon, at step 324 the request is denied and bad return code 328 is returned to the application. On the other hand, if the request is allowed, then decision 316 branches to "yes" branch 330 whereupon, at step 332 the new privilege is added to the operating system and successful return code 336 is returned to the application. Privileges include preset privileges 333 that are shipped with the operating system as well as dynamically added privileges 334 used to allow the addition of new privileges to better control usage of applications.

Returning to application processing, at step 340 the application receives a response from the operating system indicating whether the request to add the new privilege was successful. A determination is made as to whether the new privilege was added successfully (decision 344). If the privilege was not added successfully, then decision 344 branches to "no" branch 346 whereupon, at 348, the application ends with an error because the new privilege was not added. On the other hand, if the privilege was successfully added, then decision 344 branches to "yes" branch 352 whereupon, at step 356 the new service (software application) that uses the new privilege is installed and new service 360 (e.g., a software application that utilizes the new privilege to control access to the service) is made aware that the new privilege has been dynamically added.

Figure 4:
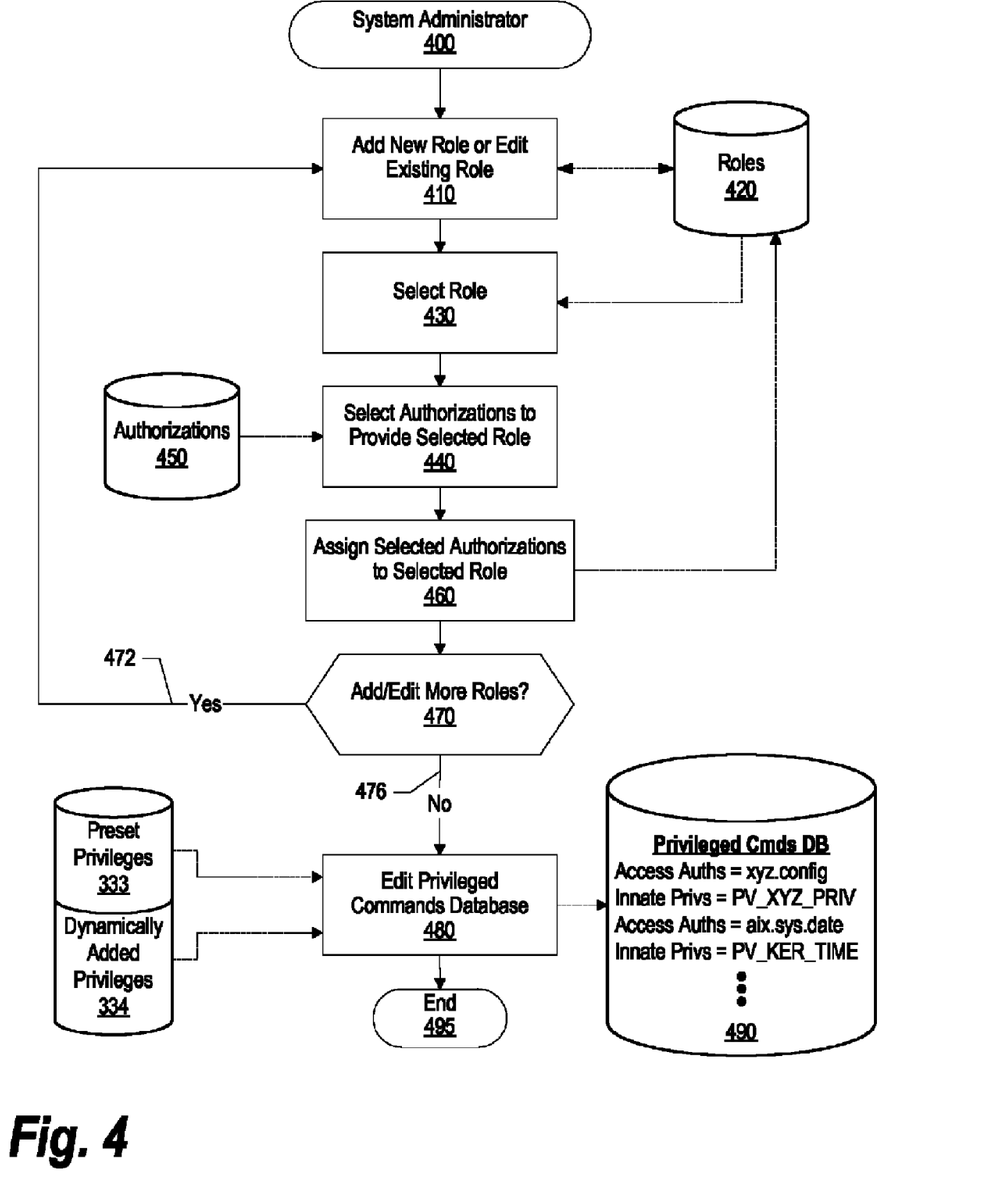
FIG. 4 is a flowchart showing steps taken by a system administrator to add roles and roles' authorizations as well as editing the privileged commands database.

FIG. 4 is a flowchart showing steps taken by a system administrator to add roles and roles' authorizations as well as editing the privileged commands database. Processing commences at 400 and is performed by an authorized person, such as a system administrator. At step 410, a new role is added to the system or an existing role is edited. Roles are stored in roles data store 420. At step 430, a role is selected from roles data store 420. At step 440, authorizations are selected from authorizations list 450 and the selected authorizations are associated with the selected role. At step 460, the selected authorizations are assigned to the selected role by storing the assignment (association) in roles data store 420. A determination is made as to whether the user wants to add or edit additional roles (decision 470). If the user wants to add or edit additional roles, then decision 470 branches to "yes" branch 472 which loops back to add or edit another role. This looping continues until the user has added or edited all the roles needed for the system, at which point decision 470 branches to "no" branch 476.

After roles have been added and authorizations have been assigned to roles, at step 480, privileged commands database 490 is edited using both preset privileges 333 as well as dynamically added privileges 334. Using the example shown in the privileged commands database, a particular authorization ("access auths") may be assigned one or more privileges ("innate privs"). In the example shown, the authorization "xyz.config" is assigned to the privilege "PV_XYZ_PRIV," which would be an example of a dynamically added privilege. Likewise, in the example shown, the authorization "aix.sys.date" is assigned to the privilege "PV_KER_TIME", which is an example of a preset (system predefined) privilege. After the privileged commands database has been edited, processing shown in FIG. 4 ends at 495

Figure 5:
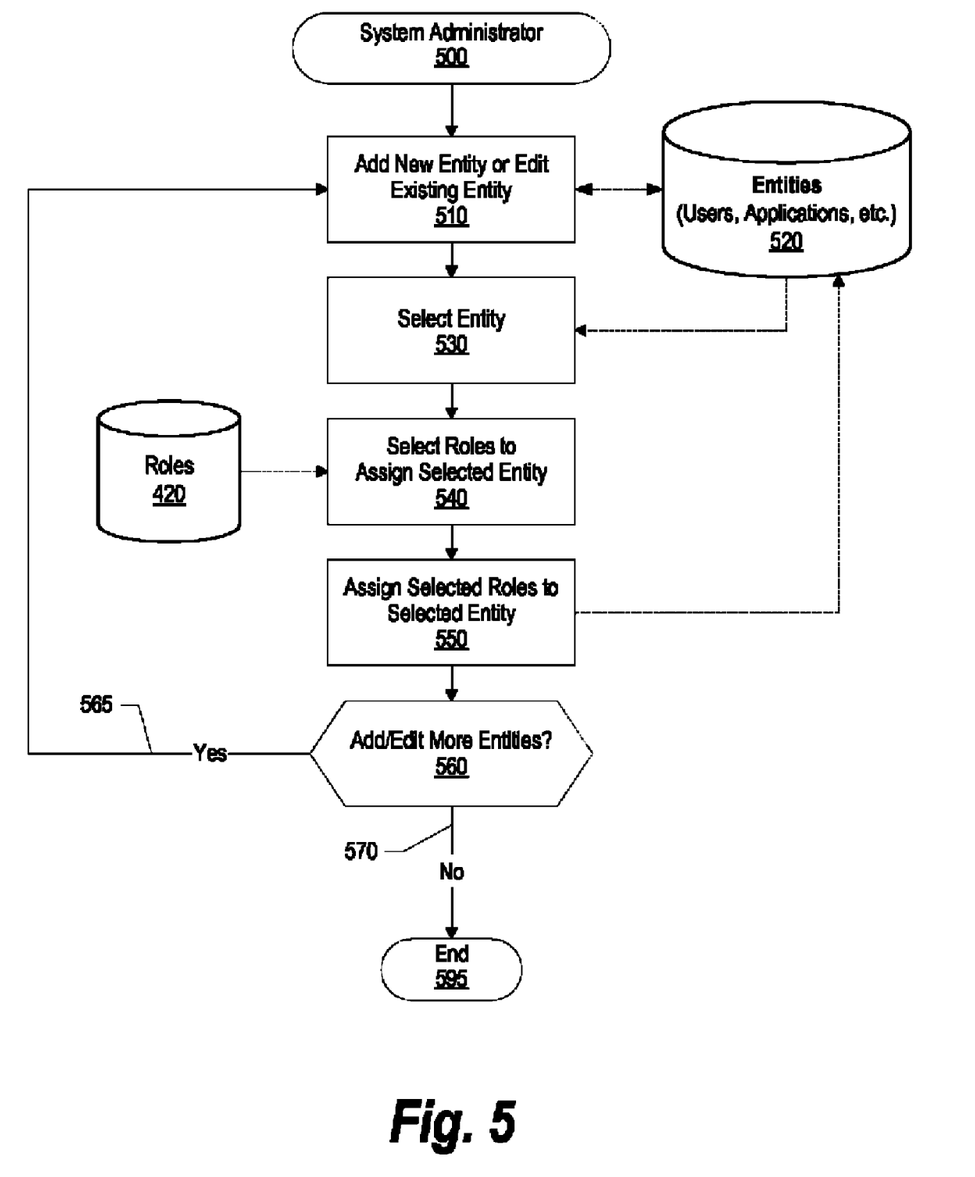
FIG. 5 is a flowchart showing steps taken by the system administrator to add entities, such as users, to the system and assign roles to the entities.

FIG. 5 is a flowchart showing steps taken by the system administrator to add entities, such as users, to the system and assign roles to the entities. Processing commences at 500 whereupon, at step 510, a new entity is added or an existing entity is edited. Data related to entities is stored in entities data store 520. In one embodiment, an entity is a user of the computer system, generally identified with a user identifier. In another embodiment, entities also include processes (i.e., software programs) that use system resources. At step 530, an entity is selected from entities data store 520. At step 540, one or more roles are selected from roles data store 420. In a banking example, a bank teller might only be assigned a "teller" role, but a supervisor, such as the bank manager, might be assigned both the "teller" role as well as other roles, such as "loan officer," etc. At step 550, the roles that were selected for the selected entity are associated with the selected entity and stored in entities data store 520. A determination is made as to whether the user wishes to add or edit additional entities (decision 560). If the user wishes to add or edit additional entities, then decision 560 branches to "yes" branch 565 which loops back to allow the user to add or edit additional entities. This looping continues until the user does not wish to add or edit additional entities, at which point decision 560 branches to "no" branch 570 and processing ends at 595.

Figure 6:
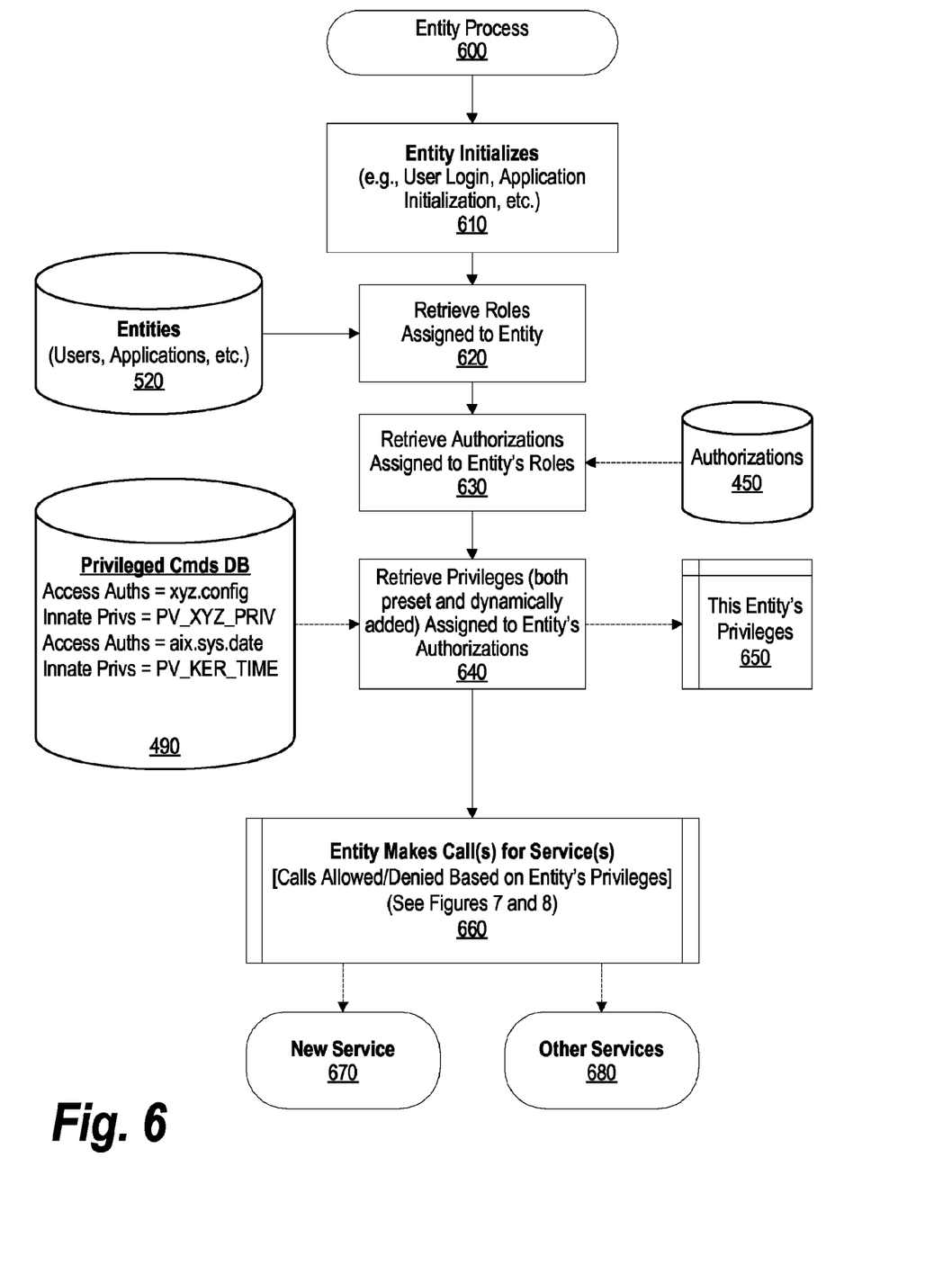
FIG. 6 is a flowchart showing steps when an entity initializes and makes calls for a service.

FIG. 6 is a flowchart showing steps when an entity initializes and makes calls for a service. Processing commences at 600 whereupon, at step 610, the entity initializes. In the case where the entity is a user, initialization would include the entity logging onto the system which generally involves the user providing a user identifier and security credential, such as a password. In the case where the entity is a process, initialization would include creation of the process. At step 620, the roles that were previously assigned to the entity are retrieved from entities data store 520. At step 630, the authorizations that have been assigned to the roles that have been assigned to this entity are retrieved from authorizations data store 450. At step 640, privileges (both preset privileges and dynamically added privileges) are retrieved from privileged commands database 490 based on the authorizations assigned to this entity through the entity's roles. A list of privileges that are available to this entity are stored in data area 650 for easy retrieval. In one embodiment, privileges are granted to an entity only when needed to perform a particular service and are revoked when the service is not longer being performed.

The entity next makes various calls for service (predefined process 660). Calls that require one or more particular privileges (privileged calls) are either allowed (executed) or inhibited (denied) based on the entity's privileges. These services include new service 670 that requires the newly added privilege in order to be executed as well as other services that require other privileges in order to be executed.

Figure 7:
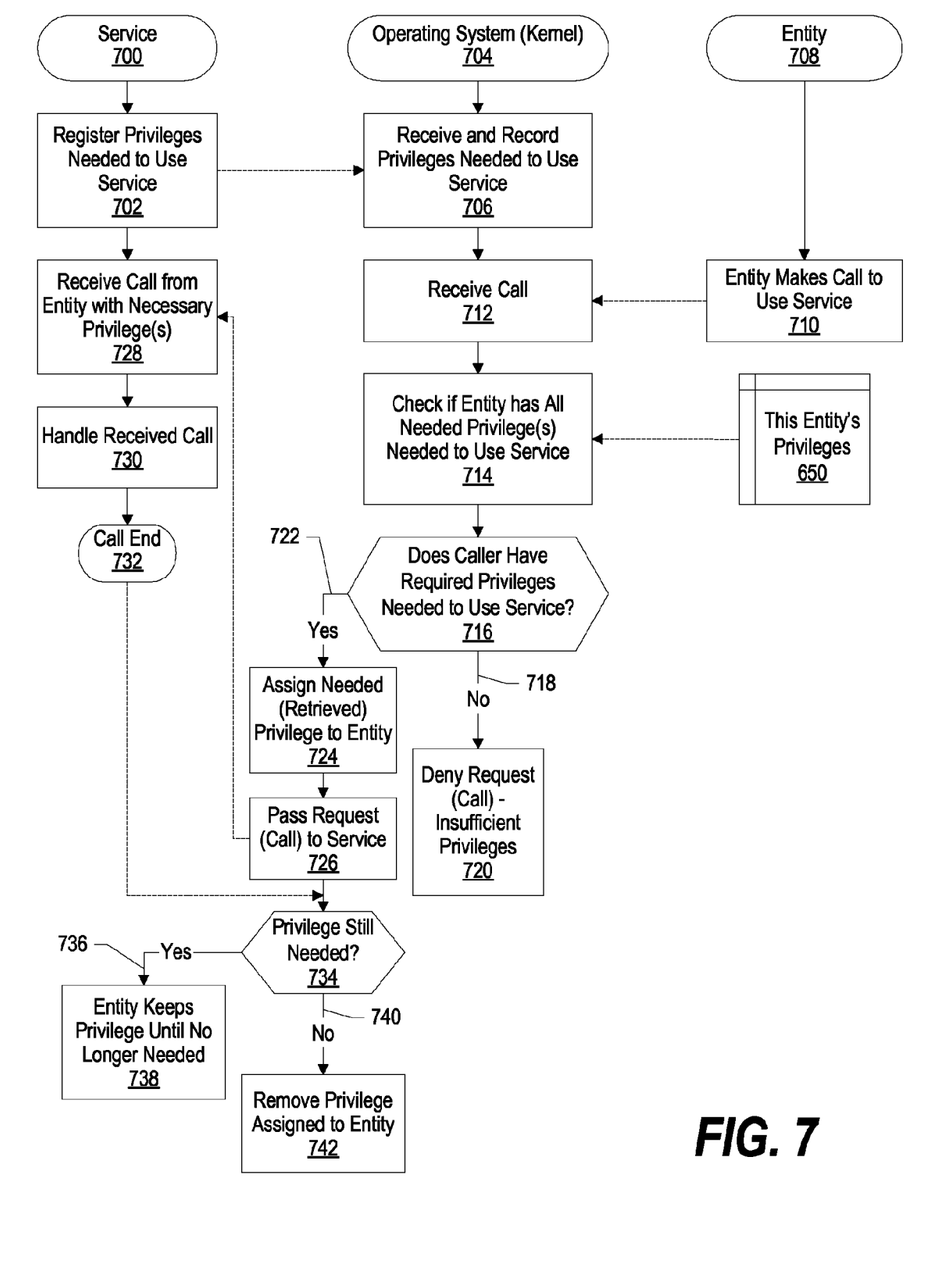
FIG. 7 is a flowchart showing steps taken to handle an entity's call for service as well as granting or denying privileges.

FIG. 7 is a flowchart showing steps taken to handle an entity's call for service as well as granting or denying privileges. Service processing is shown commencing at 700 whereupon, at step 702, the service registers one or more privileges that are required in order for an entity to use the service. Operating system (kernel) processing is shown commencing at 704 where, at step 706, the operating system receives and records the privileges needed to use the service.

Entity processing is shown commencing at 708 whereupon, at step 710, the entity makes a call to use the service. The operating system receives the entity's call (request) at 712. At step 714, the operating system compares the privileges assigned to the entity with the privileges required to use the desired service. A determination is made by the operating system as to whether the entity has all of the privileges needed in order to use the desired service (decision 716). If the entity does not have all of the privileges needed to use the desired service, then decision 716 branches to "no" branch 718 whereupon, at step 720, the entity's call (request) is denied and execution of the desired service is inhibited. In one embodiment, the operating system returns a return code or error message to the entity indicating that the call was rejected because the entity has insufficient privileges to use the service. On the other hand, if the entity has all of the privileges needed to use the service, then decision 716 branches to "yes" branch 722 whereupon, at step 724, the entity is granted the needed privileges and, at step 726, the call is passed to the service for processing.

Returning to service processing, at step 728 the service receives a call from an entity that has the privileges needed to use the service. At step 730, the service handles the request (call) and returns any responsive data or return codes to the entity. The request (call) ends at 732. In one embodiment, when the request is complete, the operating system determines whether the entity still needs to have the privilege (decision 734). In this embodiment, if the operating system determines that the entity still needs the privileges, then decision 734 branches to "yes" branch 736 and, at step 738, the entity keeps the privileges previously granted. On the other hand, if the operating system determines that the entity no longer needs the privileges, then decision 734 branches to "no" branch 740 whereupon, at step 742, the assigned privileges are removed (revoked) from the entity. Revoking privileges may prevent the entity from inadvertently, or deliberately, performing actions that disrupt the operation of the computer system because of the privileges previously granted. When the entity desires another process that requires the privilege, the privilege would be re-assigned to the entity using the processing outlined in FIG. 7.

Figure 8:
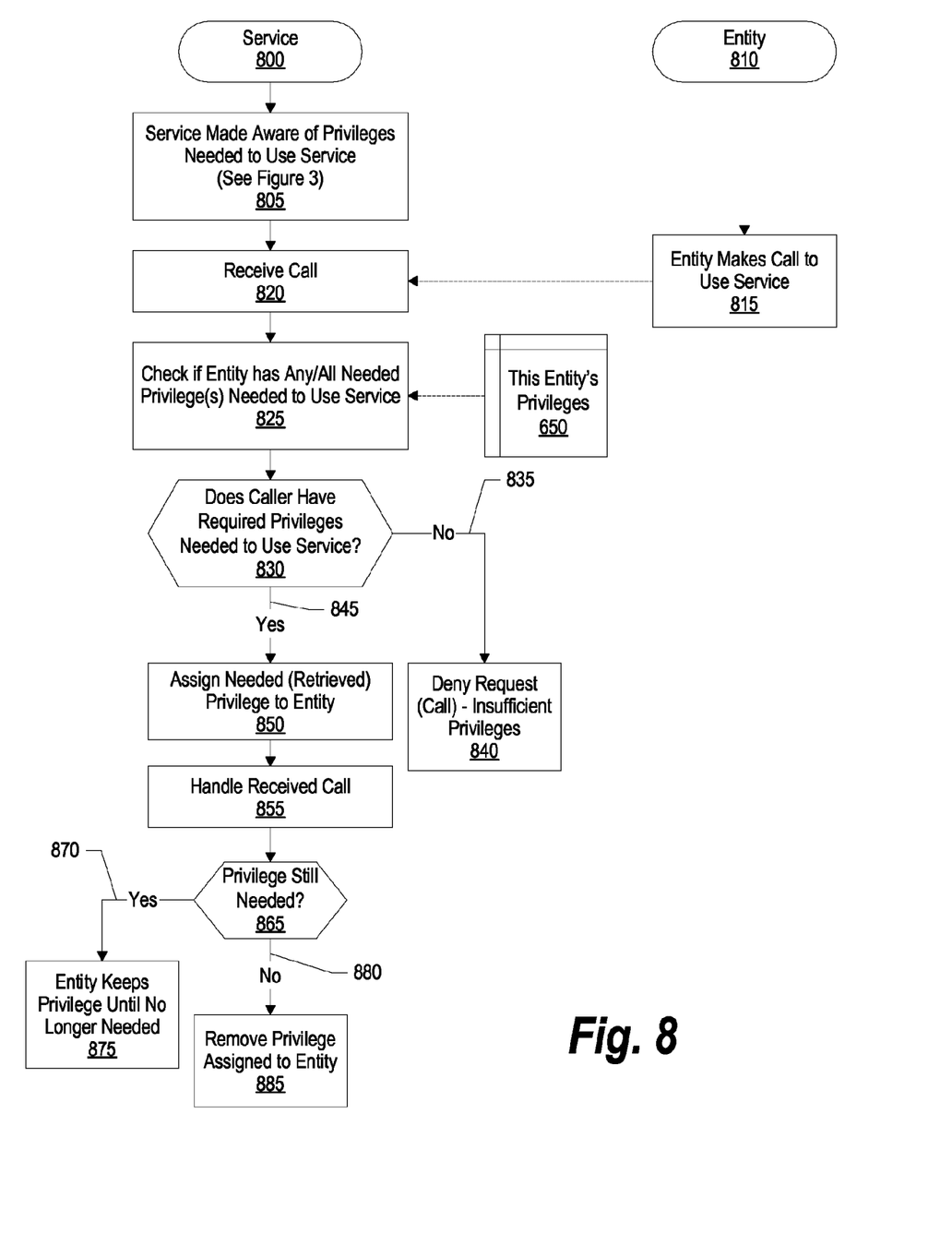
FIG. 8 is a flowchart showing steps taken by a particular service in handling calls to the service.

FIG. 8 is a flowchart showing steps taken by a particular service in handling calls to the service. This is an alternative embodiment to the embodiment shown in FIG. 7. In this embodiment, at step 805, the service is made aware of the privileges needed to use the service (see FIG. 3 and corresponding text for processing details). Entity processing is shown commencing at 810 whereupon, at step 815, the entity makes a call (request) to the service. The service receives the call at step 820. At step 825, the service compares the privileges available to the entity (listed in data area 650) with the privileges needed to use the service. A determination is made as to whether the entity has all of the privileges needed to use the service (decision 830). If the entity does not have all of the privileges needed, then decision 830 branches to "no" branch 835 whereupon, at step 840, the service returns an error to the caller (entity) and denies the request (inhibits execution of the service). On the other hand, if the entity has all of the privileges needed, then decision 830 branches to "yes" branch 845 whereupon, in one embodiment, the privileges needed to use the service are assigned to the entity at step 850. At step 855, the service handles the entity's request (call) and returns any resulting data and return codes to the entity. In one embodiment, the privilege is only held by the entity while needed. In this embodiment, the service makes a determination is made as to whether the privileges assigned to the entity are still needed by the entity. In this embodiment, if the privileges are still needed, then decision 865 branches to "yes" branch 870 whereupon, at step 875, the entity keeps the privilege until some point where the entity no longer needs the privileges. On the other hand, if the service determines that the privilege is no longer needed by the entity, then decision 865 branches to "no" branch 880 and, as step 885, the privileges assigned (granted) to the entity are removed (revoked). Note that the list of privileges stored in data store 650 is maintained so that when the entity needs to use the service again, or another service requiring various privileges, the list of privileges can be used to assign appropriate privileges to the entity as needed.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
receiving a request from a software application being executed by an operating system that is managing a computer system, wherein the request is to dynamically add a new privilege to the operating system, and wherein the new privilege is new to the operating system and allows execution of one or more software services;
determining, by the operating system, whether to allow the request based upon one or more application privileges;
dynamically adding the new privilege to the operating system in response to determining to allow the request;
installing one of the software services corresponding to the new privilege;
receiving an execution request to execute the installed software service from an entity running on the operating system;
allowing the entity to execute the installed software service in response to determining that the entity has been granted the new privilege; and
inhibiting the entity from executing the installed software service in response to determining that the entity has not been granted the new privilege.

2. The method of claim 1 further comprising:
adding a plurality of roles maintained by the operating system;
selecting one or more authorizations for each of the added roles; and
assigning the selected authorizations to the corresponding roles.

3. The method of claim 2 further comprising:
associating the new privilege with one or more of the authorizations selected for one or more of the added roles.

4. The method of claim 3 further comprising:
prior to receiving the execution request from the entity:
adding the entity by storing entity data that is associated with the entity to a data store, the data store being accessible from the computer system;
selecting one or more of the plurality of roles; and
assigning the selected roles to the added entities.

5. The method of claim 4 further comprising:
after assigning the selected roles to the entity, initializing the entity by:
retrieving the entity data from the data store;
retrieving the roles assigned to the entity;
retrieving the authorizations previously assigned to the entity's roles; and
retrieving one or more privileges associated with one or more of the retrieved authorizations, wherein one of the privileges is the new privilege.

6. The method of claim 5 further comprising:
identifying one or more privileges, including the new privilege, that correspond to the installed software service;
comparing the identified privileges with the retrieved privileges, wherein the allowing is performed in response to the retrieved privileges matching the identified privileges and wherein the inhibiting is performed in response to at least one of the identified privileges not matching any of the retrieved privileges.

7. The method of claim 6 further comprising:
granting the privileges needed to execute the software service, including the new privilege, in response to receiving the execution request and in response to a successful comparison of the retrieved privileges with the identified privileges;
executing the installed software service by the entity in response to the granting; and
revoking the privileges needed to execute the software service, including the new privileges, after the execution of the installed software service has completed.

8. A information handling system comprising:
one or more processors;
a memory accessible by at least one of the processors;
a nonvolatile storage area accessible by at least one of the processors;
a set of instructions stored in the memory and executed by at least one of the processors in order to perform actions of:
receiving a request from a software application being executed by an operating system that is managing a computer system, wherein the request is to dynamically add a new privilege to the operating system, and wherein the new privilege is new to the operating system and allows execution of one or more software services;
determining, by the operating system, whether to allow the request based upon one or more application privileges;
dynamically adding the new privilege to the operating system in response to determining to allow the request;
installing one of the software services corresponding to the new privilege;
receiving an execution request to execute the installed software service from an entity running on the operating system;
allowing the entity to execute the installed software service in response to determining that the entity has been granted the privilege; and
inhibiting the entity from executing the installed software service in response to determining that the entity has not been granted the privilege.

9. The information handling system of claim 8 wherein the set of instructions, when executed, cause at least one of the processors to perform further actions comprising:
adding a plurality of roles maintained by the operating system;
selecting one or more authorizations for each of the added roles; and
assigning the selected authorizations to the corresponding roles.

10. The information handling system of claim 9 wherein the set of instructions, when executed, cause at least one of the processors to perform further actions comprising:
associating the new privilege with one or more of the authorizations selected for one or more of the added roles.

11. The information handling system of claim 10 wherein the set of instructions, when executed, cause at least one of the processors to perform further actions comprising:
prior to receiving the execution request from the entity:
adding the entity by storing entity data that is associated with the entity to a data store, the data store being accessible from the computer system;
selecting one or more of the plurality of roles; and
assigning the selected roles to the added entities.

12. The information handling system of claim 11 wherein the set of instructions, when executed, cause at least one of the processors to perform further actions comprising:
after assigning the selected roles to the entity, initializing the entity by:
retrieving the entity data from the data store;
retrieving the roles assigned to the entity;
retrieving the authorizations previously assigned to the entity's roles; and
retrieving one or more privileges associated with one or more of the retrieved authorizations, wherein one of the privileges is the new privilege.

13. The information handling system of claim 12 wherein the set of instructions, when executed, cause at least one of the processors to perform further actions comprising:
identifying one or more privileges, including the new privilege, that correspond to the installed software service;
comparing the identified privileges with the retrieved privileges, wherein the allowing is performed in response to the retrieved privileges matching the identified privileges and wherein the inhibiting is performed in response to at least one of the identified privileges not matching any of the retrieved privileges;
granting the privileges needed to execute the software service, including the new privilege, in response to receiving the execution request and in response to a successful comparison of the retrieved privileges with the identified privileges;
executing the installed software service by the entity in response to the granting; and
revoking the privileges needed to execute the software service, including the new privileges, after the execution of the installed software service has completed.

14. A computer program product stored in a non-transitory computer readable medium, comprising functional descriptive material that, when executed by an information handling system, causes the information handling system to perform actions that include:
receiving a request from a software application being executed by an operating system that is managing a computer system, wherein the request is to dynamically add a new privilege to the operating system, and wherein the new privilege is new to the operating system and allows execution of one or more software services;
determining, by the operating system, whether to allow the request based upon one or more application privileges;
dynamically adding the new privilege to the operating system in response to determining to allow the request;
installing one of the software services corresponding to the new privilege;
receiving an execution request to execute the installed software service from an entity running on the operating system;
allowing the entity to execute the installed software service in response to determining that the entity has been granted the privilege; and
inhibiting the entity from executing the installed software service in response to determining that the entity has not been granted the privilege.

15. The computer program product of claim 14 further comprising functional descriptive material that causes the data processing system to perform additional actions that include:
adding a plurality of roles maintained by the operating system;
selecting one or more authorizations for each of the added roles; and
assigning the selected authorizations to the corresponding roles.

16. The computer program product of claim 15 further comprising functional descriptive material that causes the data processing system to perform additional actions that include:
associating the new privilege with one or more of the authorizations selected for one or more of the added roles.

17. The computer program product of claim 16 further comprising functional descriptive material that causes the data processing system to perform additional actions that include:
prior to receiving the execution request from the entity:
adding the entity by storing entity data that is associated with the entity to a data store, the data store being accessible from the computer system;
selecting one or more of the plurality of roles; and
assigning the selected roles to the added entities.

18. The computer program product of claim 17 further comprising functional descriptive material that causes the data processing system to perform additional actions that include:
after assigning the selected roles to the entity, initializing the entity by:
retrieving the entity data from the data store;
retrieving the roles assigned to the entity;
retrieving the authorizations previously assigned to the entity's roles; and
retrieving one or more privileges associated with one or more of the retrieved authorizations, wherein one of the privileges is the new privilege.

19. The computer program product of claim 18 further comprising functional descriptive material that causes the data processing system to perform additional actions that include:
identifying one or more privileges, including the new privilege, that correspond to the installed software service;
comparing the identified privileges with the retrieved privileges, wherein the allowing is performed in response to the retrieved privileges matching the identified privileges and wherein the inhibiting is performed in response to at least one of the identified privileges not matching any of the retrieved privileges.

20. The computer program product of claim 19 further comprising functional descriptive material that causes the data processing system to perform additional actions that include:
granting the privileges needed to execute the software service, including the new privilege, in response to receiving the execution request and in response to a successful comparison of the retrieved privileges with the identified privileges;

executing the installed software service by the entity in response to the granting; and revoking the privileges needed to execute the software service, including the new privileges, after the execution of the installed software service has completed.

* * * * *